(12) United States Patent
Hultman et al.

(10) Patent No.: US 6,589,667 B1
(45) Date of Patent: Jul. 8, 2003

(54) SPHERICAL POROUS IRON POWDER AND METHOD FOR PRODUCING THE SAME

(75) Inventors: Lars Hultman, Viken (SE); Sven Allroth, Höganäs (SE)

(73) Assignee: Höganäs AB, Höganäs (SE)

( * ) Notice: Subject to any disclaimer, the term of this patent is extended or adjusted under 35 U.S.C. 154(b) by 117 days.

(21) Appl. No.: 09/670,100

(22) Filed: Sep. 26, 2000

(51) Int. Cl.⁷ .................... C21B 15/00; B32B 5/16
(52) U.S. Cl. .................. 428/548; 428/570; 428/681; 428/687; 428/402; 75/343; 75/10.63; 75/770; 75/953
(58) Field of Search ................. 75/343, 10.63, 75/770, 953; 428/548, 570, 681, 687, 402

(56) References Cited

U.S. PATENT DOCUMENTS

| | | | | |
|---|---|---|---|---|
| 3,888,657 A | * | 6/1975 | Klar et al. ................. 75/0.5 B |
| 3,909,239 A | * | 9/1975 | Findeisen et al. ........ 75/0.5 BA |
| 4,274,864 A | * | 6/1981 | Bernhardt et al. ......... 75/0.5 R |
| RE30,855 E | * | 1/1982 | Chen ............................ 75/251 |
| 4,348,434 A | * | 9/1982 | Kammer et al. ............ 427/423 |
| 4,470,844 A | * | 9/1984 | Rademachers et al. .. 75/0.5 AA |
| 4,778,515 A | * | 10/1988 | Kemp, Jr. et al. ....... 75/0.5 BA |
| 4,781,753 A | * | 11/1988 | Kopatz et al. ............. 75/0.5 B |
| 4,836,850 A | * | 6/1989 | Kemp, Jr. et al. ............. 75/251 |
| 5,328,500 A | * | 7/1994 | Beltz et al. .................... 75/343 |
| 6,126,715 A | * | 10/2000 | Luk ............................. 75/351 |
| 6,364,927 B1 | * | 4/2002 | Narasimhan et al. ......... 75/252 |

* cited by examiner

*Primary Examiner*—H. Thi Le
(74) *Attorney, Agent, or Firm*—Burns, Doane, Swecker & Mathis, L.L.P.

(57) ABSTRACT

The invention concerns an iron powder characterised by spherical form and a porous structure throughout. The powder particles have an average particle diameter between 10 and 300 $\mu$m, a specific surface area of at least 100 m²/kg, a flowability of at least 35 s/50 g, a reactivity of less than 5 minutes and an apparent density lower than about 4 g/cm³.

The iron powder is prepared by subjecting a dry powder of essentially spherical iron-containing agglomerates to a heat treatment in a reducing atmosphere at a temperature and time sufficient for obtaining particles essentially consisting of metallic iron and having a porous structure throughout. The obtained particles may then be subjected to sintering at a time and temperature sufficient for obtaining the required strength.

46 Claims, No Drawings

SPHERICAL POROUS IRON POWDER AND METHOD FOR PRODUCING THE SAME

FIELD OF THE INVENTION

The present invention relates to a novel iron powder and a method for the preparation thereof.

BACKGROUND OF THE INVENTION

Iron powders of various types are well known and widely used for different applications within the chemical field.

Thus, iron powders are often used as raw materials for preparing iron containing compounds, such as inorganic and organic salts, iron oxide pigments and chelates. Iron powders are also used as auxiliary materials in various chemical processes and operations, where the powders are used e.g. as reduction agents, catalysts and extraction media for so-called cementation processes.

The rusting reaction of iron powder has two important features which are utilised in two important applications, namely its exothermic (heat generating) nature in hot-bags applications and the fact that oxygen is consumed during the reaction in oxygen absorption applications.

Several demands must be met by the iron powder material, which is to be used in any of the above mentioned chemical applications. The iron powder should have a high purity, be highly reactive, have a good flowability in order to improve the handling of the powder, have a high and active surface area, a high reactivity and good permeability for gases and liquids.

Iron powders are also used in electrophotography as carriers for toner particles.

The carrier should fulfil the following criteria. The carrier should have an appropriate triboelectric property which enables it to electrostatically hold the toner particles and to transfer the held toner particles to an electrostatic latent image on a photosensitive plate when contacted. The carrier should have a sufficient mechanical strength to protect the carrier particles from breaking or cracking and a good fluidity. The carrier particles should be uniform in their electric and magnetic properties, stable with respect to changes in the environmental conditions, such as humidity and a sufficient durability to ensure an acceptable lifetime.

At present, there are very few, if any, iron powder materials available which are useful in all the above mentioned applications. The main purpose of the present invention is to provide such an iron powder.

SUMMARY OF THE INVENTION

In brief the present invention concerns a powder useful in the above mentioned applications as well as a method for the preparation of this powder.

The most characterising features of the new powder are that the particles have an essentially spherical form, a porous structure throughout and a high specific surface area. Furthermore, the powder is distinguished by a low apparent density, a high saturation magnetisation, a high reactivity and a good flowability.

According to the present invention this new powder may be prepared by subjecting a dry powder of essentially spherical iron-containing agglomerates to a heat treatment in a reducing atmosphere at a temperature and time sufficient for obtaining particles essentially consisting of metallic iron and having a porous structure throughout. The obtained particles may then be subjected to sintering at a time and temperature sufficient for obtaining the required strength.

DETAILED DESCRIPTION OF THE INVENTION

According to the present invention the dry powder of essentially spherical agglomerates is prepared from a slurry of a selected starting material in a liquid, preferably water.

The starting material is preferably ground magnetite and/or hematite or another iron-containing compound, such as hydrated ferric oxides, such as goethite or lepidocrocite, or ferric salts. Especially preferred in this respect are highly purified ores such as benificated ores. Instead of ground magnetite and/or hematite ore it is of course also possible to use synthetically prepared magnetite or hematite. Preferably the slurry is an aqueous slurry containing e.g. 0.01–2% by weight of a binding agent, such as polyvinylalcohol, methyl cellulose and/or carbowax. Irrespectively of the origin of the starting material, the majority of the particles of this material in the slurry should have an average particle size of less than 15 $\mu$m preferably less than 5 $\mu$m. During the spray-drying spherical agglomerates of the particles of the iron-containing starting material are formed. Larger particle sizes than 15 $\mu$m could potentially be used. This would however result in more irregularly shaped agglomerates, especially for smaller agglomerate sizes.

The size of spray-dried agglomerates can be controlled and is determined by the conditions during this drying step, such as the composition of the slurry, the flow, the pressure and the type of rotary or spray nozzle used, and is selected by a man skilled in the art in view of the intended use of the final powder. Normally, the particles of the spray-dried powder have an average diameter within the range of from about 10 to 250 $\mu$m. Factors useful for controlling the porosity of the final powder particles are the particle size of the starting material and the sintering conditions.

As mentioned before relatively irregular particles could be obtained with this process e.g. by choosing the spray drying parameters and raw materials in such a way that more irregular shaped particles are formed. The main purpose is however to select the conditions is such a way that essentially spherical particles are formed.

The reduction of the spray-dried powder is important and the atmosphere, temperature and time conditions should preferably be selected so that an essentially complete reduction is obtained in order to get particles of essentially pure metallic iron having a porous structure throughout and a high specific surface area. However, for certain applications it may be sufficient or even preferred not to perform a complete reduction to metallic iron. In these cases the final powder particles include a minor amount of the starting material, e.g. magnetite or hematite. The extent of the reduction in each specific case can thus be tailored by the man skilled in the art depending on the intended final use of the powder.

The reduction is preferably performed in a continuous furnace or batch furnace in an atmosphere of hydrogen or hydrogen-containing nitrogen, cracked ammonia or carbon monooxide or combinations thereof. The reduction may also be performed in the presence carbon containing material.

In a preferred embodiment of the present method, the spray-dried spherical powder is reduced in a hydrogen based atmosphere at a temperature within the range of from about 450 to 700° C., preferably from about 500 to 6000° C. during a period of about 1 to 4 hours. The time required for the reduction will heavily depend on the type of furnace used, the amount of material in the furnace and the flow of gas etc. For this reason both shorter and longer tie might be needed than the 1–4 hours time range indicated above. The reduction to metallic iron in essentially pure hydrogen gas is preferably performed at temperatures below 600° C., and most preferably between 530 and 570° C. e.g. at 550° C.

As an alternative, the spray-dried spherical powder agglomerates is subjected to reduction in a carbon monoxide based atmosphere at a temperature within the range of from about 700 to 1300° C.

In yet another embodiment of the reduction, the spherical spray-dried material is subjected to reduction in the presence of carbon-containing material such as graphite at a temperature of from about 1100 to 1300° C., preferably about 1200° C.

According to a preferred embodiment the reduction is performed during such conditions that spherical particles consisting of essentially pure iron is obtained.

If necessary and in order to obtain a sufficient mechanical strength the reduced powder is subjected to a sintering process, which may be performed in the same atmospheres as indicated above or modifications thereof at temperatures within the range of from about 800 to 1300° C., preferably from about 800 to 1100° C. The sintering step is of particular interest when the reduction is performed at low temperature.

In order to remove the binding agent and increase the mechanical strength, the spray-dried agglomerates may also be subjected to a pre-sintering step in an inert atmosphere.

Typically, the iron powder particles obtained after reduction and optional sintering have an average diameter within the range of from about 10 to 250 µm Depending on the particular application, the average diameter can easily be selected within the entire the range. The specific surface area, SSA, as measured by a BET instrument, is normally above 100 $m^2/kg$, preferably above 300 $m^2/kg$ and the powder is distinguished by a fine microporous structure essentially free from iron oxides. If the reduction is performed until essentially all oxides are finally reduced, the powder according to the present invention consists of metallic iron and at most 2% by weight, preferably less than 1% by weight, of inevitable impurities. The powder according to the present invention consists of iron, most of which is in the metallic form, and at most 3% by weight, preferably less than 2% by weight, of inevitable impurities. The oxygen content of the powder is normally less than 1% by weight, preferably less than 0.75% by weight.

The apparent density of the obtained powder is within the range of from about 0.5 to 4 $g/cm^3$, typically from about 1.0 to 2.5 $g/cm^3$.

The chemical reactivity of an iron powder is mainly dependent on the purity and specific surface area of the same.

The specific surface area of conventional iron powder is largely dependent on the particle size of the iron powder particles as well as the shape and porosity of the same.

Available iron powders are either irregular or spherical. Irregular powders could be made by a range of methods e.g. by the well known water atomisation process or by any reduction process, e.g. the sponge iron process. In this group, powder with good reactivity could be found. However, the flowabilty of such a powder is very poor which causes problems when the powder is handled and/or in the chemical process.

Spherical powder could also be made by a range of methods, such as gas atomising or by thermal decomposition of pentacarbonyl, in order to form a very fine carbonyl iron powder. Although these powders are spherical, and have good flowability, the specific surface for a given particle size is rather low, leading to low reactivity in chemical reactions.

The spherical shape of the iron powder according to the invention combined with the highly porous structure throughout each iron particle decreases the above mentioned disadvantages significantly. The iron powder according to the invention possesses a unique combination of good flowability and extremely high reactivity. Furthermore, the specific surface area and by that the reactivity of the powder is not critically dependent on the particle size of the powder why for the first time intermediate powder particles having extremely high reactivity and good flowability could be obtained.

A preferred powder according to the present invention consists essentially of pure (metallic) iron, which means that the reduction of the magnetite/hematite is essentially complete. Such a powder is distinguished by a saturation magnetisation above 190 emu/g, preferably above 200 emu/g. It should be noted that pure iron has a $\sigma_s$ value of 200–220 emu/g. Other important magnetic properties that distinguish this preferred powder are a low remanence $\sigma_r$, normally less than 5 emu/g, preferably less than 3 emu/g, and a low coercivity $H_C$, normally less than 30 Oe, preferably less than 25 Oe. Powders distinguished by a high iron content have a relatively good conductivity as a consequence of the high iron content. The high conductivity could easily be decreased by e.g. surface oxidation or other surface treatments if required.

The spherical form and low apparent density of the iron powder material according to the invention makes it suitable as a carrier core material which displays significant advantages compared to commercially available iron based carrier core materials. According to the state of the art, carrier cores are normally coated with a thin resinous layer in order to produce a carrier material. The coating is needed it order to adjust the tribo, add life and adjust resistivity. The life of carrier materials today is to a large extent determined by the condition of the resinous coating. In the application the carrier+toner mix, normally referred to as "developer" is under motion, causing several interaction phenomena to occur. Toner particles could e.g. be adhered and smeared out on the carrier surfaces, due to sudden impact or friction between individual carrier particles. This toner smearing will change the surface properties of the carrier and thus will decrease the life of the same. A carrier powder having a high specific weight or high AD or irregular shaped particles will pronounce this problem. Another problem is flaking of the coating. Areas of the coating might come loose from the carrier core. This problem is also pronounced if the carrier core has sharper edges, i.e. is more irregular in its shape. The spherical shape of the iron powder particles according to the invention combined with low specific weight of individual powder particles (or low AD of the powder) decreases the above mentioned disadvantages significantly. The low specific weight and spherical shape will decrease the Herzian pressure (contact pressure) and friction between individual powder particles in the electrophotographic application. This will increase the life of the resinous coating and decrease the tendency for flaking of the coating. The porous structure of the carrier core will also improve that resinous coating adhesion even further. Also the spherical porous iron powder according to the invention will have very low abrasive action against the hardware in the machine compared to established iron based carrier core materials. Further, the low specific weight and low AD means that weight for a given carrier core volume will decrease compared to established iron based carrier core materials. The decreased weight decreases the stirring torque and by that the energy consumption.

According to a specific embodiment of the invention the iron powder is coated with a resinous layer in an amount of 1.5 to 6% by weight. When used as a carrier material the resin may also be impregnated into the porous particles according to the present invention.

The state and appearance of the iron powder are very important for its performance as a carrier in electrophotographic applications. Machine manufacturers have varying requirements depending on how the machine is designed and depending on the toner in the developer. In some machines a rather rough surface morphology is wanted while in others a smooth surface is preferred. This is yet another advantage with the material according to the invention, since the surface morphology could easily be adjusted from rather rough or intermediate as-sintered surface to a very smooth surface by various physical treatments, e.g. gentle milling in order to make to the surface smoother. The physical treatment could also be made more abusive, causing more severe deformation of the particles to occur, which actually could be an advantage for some applications.

The electrical properties of the carrier cores are also very important for the properties in the application. The machines are designed for various levels of the resistivity, voltage breakdown and charging properties of the carrier particles.

These properties could easily be adjusted for the iron powder according to the invention. The as-sintered material according to the invention do mainly consist of iron which is a conductive material. By oxidation, the conductive behavior will be changed to more resistive. This is yet another distinct advantage for the material according to the invention. Depending on how long the oxidation proceeds, the resistivity could be tailored to a desired point ranging from highly conductive to highly resistive.

Depending on how the oxidation parameters are chosen, the state and amount of iron oxide formed could be tailored.

If the oxidation is performed under sufficiently long time, due to phase transformations (from iron to various iron oxides) also the magnetic saturation of the material might brought down, why a material with not only increased resistivity, but also decreased magnetic saturation could be obtained. This is referred to as deep oxidation. Oxidation will to some extent introduce stresses in individual particles, which could be reflected in the magnetic properties i.e. by increased remanence and coercivity. This could easily be adjusted to acceptable by an appropriate heat treatment in protective atmosphere in order to relax the stresses.

The conductive behavior of the material could also be adjusted by surface treatments with various inorganic materials possibly in combination with the surface or deep oxidation described above. The inorganic materials could be added in various ways e.g. as solid particles, through a liquid or a gas.

The reduced particulate material may be subjected to oxidation treatment or other inorganic treatment, in order to adjust the characteristic properties of the carrier core material. The state and appearance of the particulate surfaces might also be adjusted by various physical treatment like milling. Further the as-reduced particulate material or after treatment according to above, might be coated with a resinous material. This could be done in many ways, e.g. by dipping the material in a solution of such resinous material in a volatile organic solvent or by spraying the resinous solution over a fluidised bed-of the particulate material. A long range of organic, organo-metallic, inorganic and metallic additives might be added to the resinous material in order to optimise the properties of the carrier material.

Examples of organic solvents which may be used include methyl ethyl ketone, xylenes, n-butanol, methyl cyclohexane, methyl isobutyl ketone and toluene. The coated particulate material may be heated to an elevated temperature depending on the nature of the resinous material employed.

The nature of the resinous materials which may be used in the invention is not critical and they may be of any appropriate soluble type.

A long range of additives might also be added to the resinous materials. The objective of these additives might e.g. be to control charge and electrical, magnetic, powder flow properties. These additives could be of various types including e.g. organic, Organo-metallic, inorganic and metallic and added in amounts needed for the obtaining the properties requested.

The amount of the resinous material to be applied to the particulate material is governed by the nature of the resin employed and the type of electrophotographic equipment (and hence the electrostatic and electric resistivity properties suitable for the machine) for which the product carrier is to be supplied.

Generally, the amount of applied resin suitable for the purpose of the invention will be in the range of 0.5–8%, preferably 1.5–6%, by weight of the partially reduced magnetite material.

The resin-coated carrier material according to the present invention may be used in conjunction with conventional toners such as those, for example, made from a natural resin, a synthetic resin, a blend of natural and synthetic resins or such a material modified by incorporation of any appropriate additives.

The invention is illustrated but not limited to the following examples.

Example 1

Magnetite powder having an average particle size of about 1 $\mu$m was dispersed in water to give a homogeneous aqueous slurry containing 0.4% by weight of polyvinyl alcohol. Then the slurry was spray dried in a spray drier to form spherical agglomerates of 10–150 $\mu$m in diameter.

The agglomerates were reduced at about 550° C. in a hydrogen atmosphere for 80 minutes in order to transform the magnetite to iron. The temperature was then raised to 900° C. and held there for 40 minutes in order to sinter the material. After this the powder was allowed to cool to room temperature, and after this lightly ground. The thus prepared spherical particles contained mainly iron and had the following properties (the magnetic measurements were performed with a BH curve tracer from Riken Denshi and the SSA with a BET instrument):

| | |
|---|---|
| Saturation magnetisation: | 206 emu/g |
| Remanence | 2.2 emu/g |
| Coercivity | 19 Oe |
| AD | 2.2 g/cc |
| Flow | 26 sec/50 g |
| SSA | 513 m$^2$/kg |

The iron content of the powder was 98.5 wt %, 98.4% of which was pure metallic iron.

Example 2

Magnetite powder having an average particle size of approx 3 $\mu$m was dispersed in water to give a homogeneous aqueous slurry. Then the slurry was spray dried in a spray drier to form spherical agglomerates of 20–200 $\mu$m in diameter.

The agglomerates were reduced at about 550° C. in a hydrogen atmosphere for 80 minutes in order to transform the magnetite to iron. The temperature was then raised to 890° C. and held there for 40 minutes in order to sinter the material. After this the powder was allowed to cool to room temperature, and after this lightly ground. The thus prepared spherical particles contained mainly iron and had the following properties:

| | |
|---|---|
| Saturation magnetisation: | 206 emu/g |
| Remanence | 2.5 emu/g |
| Coercivity | 22 Oe |
| AD | 2.0 g/cc |

|   |   |
|---|---|
| Flow | 28 sec/50 g |
| SSA | 515 m²/kg |

Essentially the same iron content as in example 1 was obtained.

Example 3

Hematite powder having an average particle size of approx 1.5 μm was dispersed in water to give a homogeneous aqueous slurry. Then the slurry was spray dried in a spray drier to form spherical agglomerates of 10–200 μm in diameter.

The agglomerates were reduced at about 550° C. in a hydrogen atmosphere for 80 minutes in order to transform the magnetite to iron. The temperature was then raised to 900° C. and held there for 40 minutes in order to sinter the material. After this the powder was allowed to cool to room temperature, and after this lightly ground. The thus prepared spherical particles contained mainly Iron and had the following properties:

|   |   |
|---|---|
| Saturation magnetisation: | 207 emu/g |
| Remanence | 2.8 emu/g |
| Coercivity | 23 Oe |
| AD | 1.7 g/cc |
| Flow | 29 sec/50 g |
| SSA | 555 m²/kg |

Essentially the same iron content as in example 1 was obtained.

Example 4

A powder mixture containing 50% Hematite and 50% Magnetite powder both having an average particle size of approx 1.5 μm was dispersed in water to give a homogeneous aqueous slurry.

Then the slurry was spray dried in a spray drier to form spherical agglomerates of 10–200 μm in diameter. The agglomerates were reduced at about 550° C. in a hydrogen atmosphere for 80 minutes in order to transform the magnetite to iron. The temperature was then raised to 900° C. and held there for 40 minutes in order to sinter the material. After this the powder was allowed to cool to room temperature, and after this lightly ground. The thus prepared spherical particles contained-mainly iron and had the following properties:

|   |   |
|---|---|
| Saturation magnetisation: | 205 emu/g |
| Remanence | 2.5 emu/g |
| Coercivity | 23 Oe |
| AD | 1.9 g/cc |
| Flow | 28 sec/50 g |
| SSA | 525 m²/kg |

Essentially the same iron content as in example 1 was obtained.

The following table discloses powder properties critical for applications. Commercially available iron powders are compared with the spherical porous iron powder according to the invention. It can be seen that the spherical porous iron powder according to the invention possesses a unique combination of properties which makes it highly suitable for a long range of applications, such as an auxiliary material in chemical processes and operations as reduction agent, catalyst or extraction media for so-called cementation processes, for rusting reactions in e.g. hot bags and oxygen absorption applications, in pyrotechnic applications, in food and pharmaceuticals, as a reagent in chemical processes and operations and as an electrophotographic carrier.

| Type of powder | Particle size (μm) | AD (g/cc) | Flow-ability (s/50 g) | Specific surface area (m²/kg) | Reactivity (min) | Permeability for gases or liquids |
|---|---|---|---|---|---|---|
| Sponge, conventional | 20–250 | 2.25–2.75 | <32 | 80–100 | 10–20 | Acceptable |
| Sponge, high reactivity | >1000 | <2.30 | No flow | 100–120 | 8–10 | Good |
| Sponge Fine powder | 20–100 | 2.75–3.10 | No flow | 80–100 | 10–20 | Poor |
| Water Atomised Conventional | 20–250 | 2.75–3.10 | <28 | 60–80 | 40–80 | Poor |
| Water Atomised Fine | 20–100 | 2.75–3.10 | <26 | 80–100 | 20–40 | Very poor |
| Gas atomised | 20–100 | 3.8–4.4 | <20 | 50–70 | 40–80 | Very poor |
| Spherical Porous iron* | 20–250 | 1.5–2.5 | 20–30 | 400–600 | 0.5–2 | Good |

*Powder according to the present invention

Ranges for particle size was obtained by optical inspection using a SEM.

Flow rate was measured with a Hall flow meter according to ISO 4490

Apparent density according to ISO 3923/1

Specific surface was measured with a BET equipment

Reactivity was measured as the half-life of a powder when dissolved in diluted hydrochloric acid (1:8) at room temperature by determination of the evolved volume of hydrogen as a function of time. Thus, the lower the figure the higher reactivity.

What is claimed is:

1. An iron powder, comprising iron particles having essentially spherical form, a porous structure throughout, an average particle diameter between 10–300 μm, a specific surface area of at least 100 m$^2$/kg, a flowability of less than 35 s/50 g, a reactivity of less than 5 minutes and an apparent density lower than about 4 g/cm$^3$.

2. An iron powder according to claim 1 comprising at least 50% by weight of metallic iron, the balance being unreduced iron-containing material.

3. An iron powder according to claim 2 comprising at least 95% by weight of metallic iron.

4. An iron powder according to claim 3 including at most 3%.

5. An iron powder according to claim 3 including at most 2% by weight of inevitable impurities.

6. An iron powder according to claim 2 comprising at least 97% by weight of metallic iron.

7. An iron powder according to claim 2 including at most 3% by weight of inevitable impurities.

8. An iron powder according to claim 2 including at most 2% by weight of inevitable impurities.

9. An iron powder according to claim 1 comprising at least 70% by weight of metallic iron, the balance being unreduced iron-containing material.

10. An iron powder according to claim 1 comprising at least 90% by weight of metallic iron, the balance being unreduced iron-containing material.

11. An iron powder according to claim 1, wherein the apparent density is within the range of from about 0.5 to 4 g/cm$^3$.

12. An iron powder according to claim 1, wherein the apparent density is within the range of from about 1.0 to 2.5 g/cm$^3$.

13. An iron powder according to claim 1, wherein the specific surface area is at least 300 m$^2$/kg.

14. An iron powder according to claim 1, having a saturation magnetisation of at least 200 emu/g.

15. An iron powder according to claim 1, having a remanence less than about 5 emu/g.

16. An iron powder according to claim 1, having a remanence less than about 3 emu/g.

17. An iron powder according to claim 1, having a coercivity less than 30 Oe.

18. An iron powder according to claim 1, having a coercivity less than 25 Oe.

19. An iron powder according to claim 1, subjected to oxidation treatment or other inorganic treatment.

20. An iron powder according to claim 1 in combination with a resin in an amount of 1.5 to 6% by weight.

21. An iron powder according to claim 20, having the resin coated as a layer on the particles.

22. An iron powder according to claim 20, having the resin impregnated in the iron particles.

23. An iron powder according to claim 20, wherein organo-metallic, inorganic and metallic additives have been added to the resin.

24. A method for the preparation of an iron powder according to claim 1, comprising:
    subjecting a dry powder of essentially spherical iron-containing agglomerates to a heat treatment in a reducing atmosphere at a temperature and time sufficient for obtaining particles essentially consisting of metallic iron and having a porous structure throughout; and
    optionally, subsequently sintering the obtained powder at a temperature and time sufficient for obtaining the required strength.

25. A method according to claim 24, wherein the dry powder of essentially spherical, iron-containing agglomerates is prepared by spray-drying a slurry containing synthetically prepared magnetite and/or hematite particles.

26. A method according to claim 25, wherein the dry powder of essentially spherical, iron-containing agglomerates is prepared by spray-drying a slurry containing hydrated ferric oxides or ferric salts.

27. A method according to claim 25, wherein the dry powder of essentially spherical, iron-containing agglomerates is prepared by spray-drying a slurry containing goethite or lepidocrocite.

28. A method according to claim 24, wherein the dry powder of essentially spherical, iron-containing agglomerates is prepared by spray-drying a slurry containing hydrated ferric oxides or ferric salts.

29. A method according to claim 24, wherein the dry powder of essentially spherical, iron-containing agglomerates is prepared by spray-drying a slurry containing goethite or lepidocrocite.

30. A method according to claim 24, wherein the majority of the agglomerates have an average diameter within the range of about 10 to 250 μm.

31. A method according to claim 30, wherein the iron-containing particles in the agglomerates have an average particle size below 15 μm.

32. A method according to claim 30, wherein the iron-containing particles in the agglomerates have an average particle size below 5 μm.

33. A method according to claim 24, wherein the reduction is performed in a hydrogen-base atmosphere, in a carbon monoxide atmosphere, in a cracked ammonia atmosphere, in the presence of a carbon containing material or combinations thereof.

34. A method according to claim 24, wherein the reduction is performed in a hydrogen based atmosphere at a temperature within the range of from about 450° to 700° C.

35. A method according to claim 24, wherein the reduction is performed in a hydrogen based atmosphere at a temperature within the range of from about 500° to 600° C.

36. A method according to claim 24, wherein the reduction is performed in a hydrogen based atmosphere at a temperature within the range of from about 530° and 570° C.

37. A method according to claim 24, wherein the reduction is performed in a carbon monoxide based atmosphere at a temperature within the range of from about 700° to 1300° C.

38. A method according to claim 24, wherein the reduction is performed in the presence of carbon-containing material at a temperature of from about 1100° to 1300° C.

39. A method according to claim 24, wherein the reduction is performed in the presence of carbon-containing material at a temperature of about 1200° C.

40. A method according to claim 24, wherein the reduction is performed until a powder consisting of more than 50% of pure metallic iron is obtained.

41. A method according to claim 40, wherein the reduction is performed until a powder consisting of more than 95% of pure metallic iron is obtained.

42. A method according to claim 40, wherein the reduction is performed until a powder consisting of more than 97% by weight of pure metallic iron is obtained.

43. A method according to claim 24, wherein the reduction is performed until a powder consisting of more than 70% of pure metallic iron is obtained.

44. A method according to claim 24, wherein the reduction is performed until a powder consisting of more than 90% of pure metallic iron is obtained.

45. A method according to claim 9, wherein the sintering is performed at a temperature within the range of about 800° to 1300° C.

46. A method according to claim 24, wherein the sintering is performed at a temperature within the range of about 850° to 1100° C.

* * * * *